United States Patent
Nakura

(10) Patent No.: US 8,236,449 B2
(45) Date of Patent: Aug. 7, 2012

(54) LITHIUM ION SECONDARY BATTERY WITH IMPROVED ELECTRODE STABILITY AND SAFETY

(75) Inventor: Kensuke Nakura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/915,781

(22) PCT Filed: Jun. 26, 2006

(86) PCT No.: PCT/JP2006/312728
§ 371 (c)(1),
(2), (4) Date: Nov. 28, 2007

(87) PCT Pub. No.: WO2007/007542
PCT Pub. Date: Jan. 18, 2007

(65) Prior Publication Data
US 2009/0081547 A1    Mar. 26, 2009

(30) Foreign Application Priority Data
Jul. 11, 2005 (JP) .................................. 2005-202013

(51) Int. Cl.
*H01M 4/13* (2010.01)
(52) U.S. Cl. ..................... 429/231.3; 429/223; 429/224; 429/231.5
(58) Field of Classification Search ........... 429/122–347
See application file for complete search history.

(56) References Cited

U.S. PATENT DOCUMENTS

2004/0234853 A1    11/2004    Adachi et al.
2005/0220701 A1*   10/2005    Suhara et al. .............. 423/594.6

FOREIGN PATENT DOCUMENTS

| CN | 1557036 A | 12/2004 |
|----|-----------|---------|
| EP | 0736918 A1 * | 9/1996 |
| JP | 08-236114 | 9/1996 |
| JP | 09-035715 | 2/1997 |
| JP | 10-321258 | 12/1998 |
| JP | 11-016566 | 1/1999 |
| JP | 11-317230 | 11/1999 |
| JP | 2001-196063 | 7/2001 |

(Continued)

OTHER PUBLICATIONS

Liu H., et al., Cathode materials for lithium ion batteries prepared by sol-gel methods, J. Solid State Electrochem. (2004) vol. 8, pp. 450-466.*

(Continued)

*Primary Examiner* — Basia Ridley
*Assistant Examiner* — Jonathan G Leong
(74) *Attorney, Agent, or Firm* — McDermott Will & Emery LLP

(57) ABSTRACT

A lithium ion secondary battery is provided including a positive electrode, a negative electrode, and a non-aqueous electrolyte. The positive electrode includes active material particles. The active material particles include secondary particles of a lithium composite oxide, and some of the secondary particles have a crack. At least a surface layer portion of the active material particles includes element Me of at least one selected from the group consisting of Mn, Al, Mg, Ca, Zr, B, W, Nb, Ta, In, Mo, and Sn. Element Me is distributed more in the surface layer portion compared with an inner portion of the active material particles.

12 Claims, 1 Drawing Sheet

FOREIGN PATENT DOCUMENTS

| | | |
|---|---|---|
| JP | 2003-123750 | 4/2003 |
| JP | 2003-173775 | 6/2003 |
| WO | WO 00/70694 | 11/2000 |
| WO | WO2004088776 | * 10/2004 |

OTHER PUBLICATIONS

Yoshio et al., Preparation of LiyMnxNi1-xO2 as a cathode for lithium-ion batteries, Dec. 1997, J. Power Sources, vol. 74, pp. 46-53.*

Liu et al., A comparative study of LiNi0.8Co0.2O2 cathode materials modified by lattice-doping and surface-coating, Nov. 2003, Solid State Ionics, vol. 166, pp. 317-325.*

D'Epifanio et al., Thermal, electrochemical and structural properties of stablized LiNiyCo1-y-zMzO2 lithium-ion cathode material prepared by a chemical route, Sep. 2001, Phys. Chem. Chem. Phys., vol. 3, pp. 4399-4403.*

* cited by examiner

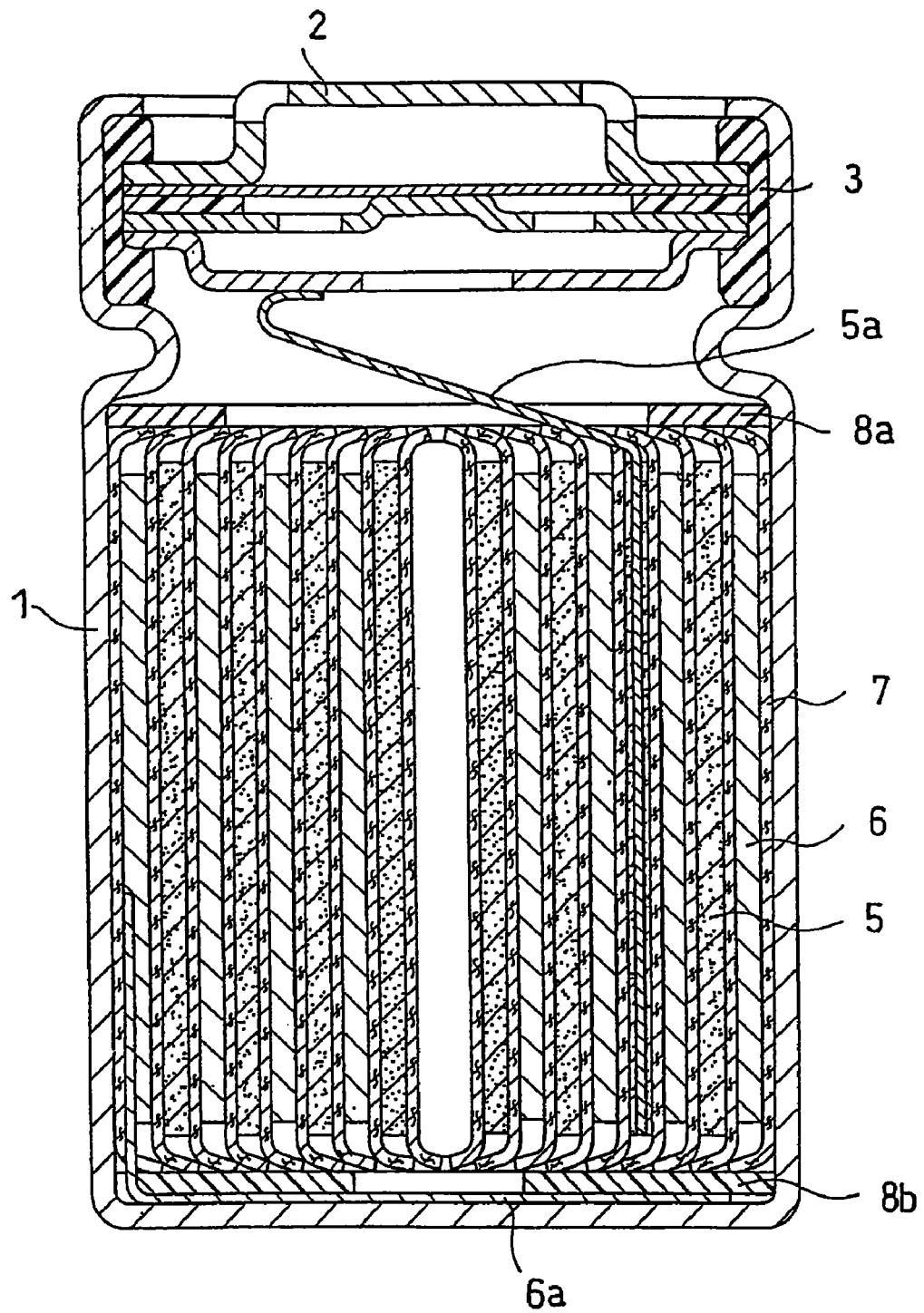

LITHIUM ION SECONDARY BATTERY WITH IMPROVED ELECTRODE STABILITY AND SAFETY

RELATED APPLICATIONS

This application is the U.S. National Phase under 35 U.S.C. §371 of International Application No. PCT/JP2006/312728, filed on Jun. 26, 2006, which in turn claims the benefit of Japanese Application No. 2005-202013, filed on Jul. 11, 2005, the disclosures of which Applications are incorporated by reference herein.

TECHNICAL FIELD

The present invention relates to a lithium ion secondary battery that is excellently safe at the time of shorting and overcharging.

BACKGROUND ART

Lithium ion secondary batteries, a typical representative of non-aqueous electrolyte secondary batteries, have a high electromotive force and a high energy density, and therefore a demand is increasing for lithium ion secondary batteries as a main power source for mobile telecommunication devices and portable electronic devices. Majority of the lithium ion secondary batteries currently on the market use a lithium composite oxide mainly composed of cobalt as the positive electrode active material. However, in the case of the lithium composite oxide mainly composed of cobalt, because the cost of the cobalt compound used as the raw material is high, there have been vigorous researches also on the lithium composite oxide composed mainly of nickel.

Upon charging, a lithium composite oxide mainly composed of Co or Ni contains $Co^{4+}$ or $Ni^{4+}$ that are highly reactive and high in valence. Due to this fact, under a high-temperature environment, the electrolyte decomposition reaction involving the lithium composite oxide is accelerated to generate gas in the battery, making it difficult to curb the heat generation at the time of shorting.

The following may be the reasons why it is difficult to curb the heat generation at the time of shorting. When shorting is caused for example by a nail penetration, Joule heat is generated at the short circuit portion. The heat induces the thermal decomposition reaction of the positive electrode active material and the reaction between the active material and the electrolyte. Since these reactions involve heat generation, when the reactions cannot be curbed, abnormal heat is generated in the battery.

The thermal decomposition reaction of the active material is the reaction of oxygen desorption from the active material surface, and the electrolyte decomposition reaction is a reaction between the active material surface and the electrolyte. As a result of various examinations, it was found that these reactions promote at active sites of the active material surface that are formed due to lattice defects.

Thus, to secure the safety at the time of shorting, there has been proposed that a predetermined metal oxide coating film is formed on the active material surface (patent documents 1 to 7).

On the other hand, to secure the safety upon overcharging, there have been proposed a mechanism for mechanically shutting down the current by using an increase in the battery internal pressure, a mechanism for shutting down the current with a PTC element by using an increase in battery temperature, and a mechanism for shutting down the current with a shutdown function of the separator of polyolefin having a low melting point. Also proposed is a method in which a starting material of the conductive polymer which polymerizes upon overcharging is added to the electrolyte, to create a minute short circuit portion with the conductive polymer upon overcharging in the battery to allow an automatic discharge (hereinafter, referred to as internal short-circuit safety mechanism). (Patent Document 8)

[Patent Document 1] Japanese Laid-Open Patent Publication No. Hei 8-236114
[Patent Document 2] Japanese Laid-Open Patent Publication No. Hei 9-35715
[Patent Document 3] Japanese Laid-Open Patent Publication No. Hei 11-317230
[Patent Document 4] Japanese Laid-Open Patent Publication No. Hei 11-16566
[Patent Document 5] Japanese Laid-Open Patent Publication No. 2001-196063
[Patent Document 6] Japanese Laid-Open Patent Publication No. 2003-173775
[Patent Document 7] Japanese Unexamined Patent Application No. 2003-500318
[Patent Document 8] Japanese Laid-Open Patent Publication No. Hei 10-321258

DISCLOSURE OF THE INVENTION

Problem to be Solved by the Invention

When a predetermined metal oxide coating film is formed on the active material surface, the active material decomposition reaction and the reaction between the active material and the electrolyte are curbed, and therefore safety at the time of shorting is improved.

However, since the active material particle surface is covered with some different components, it also curbs the metal elution from the active material upon overcharging. The metal eluted upon overcharging tends to form a minute short circuit portion in the battery, and functions similarly to the internal short-circuit safety mechanism proposed in Patent Document 8. When the active material particle surface is covered with the different components, such an internal short-circuit safety mechanism does not function, and safety upon overcharging cannot be secured sufficiently.

The present invention aims to achieve both safety at the time of shorting by for example a nail penetration, and safety upon overcharging.

Means for Solving the Problem

The present invention relates to a lithium ion secondary battery including:
a positive electrode capable of charging and discharging;
a negative electrode capable of charging and discharging; and
a non-aqueous electrolyte,
wherein the positive electrode includes active material particles,
the active material particles include secondary particles of a lithium composite oxide,
the secondary particles include a secondary particle with a crack and a secondary particle without a crack,
at least a surface layer portion of the active material particles includes at least one element Me selected from the group consisting of Mn, Al, Mg, Ca, Zr, B, W, Nb, Ta, In, Mo, and Sn, and element Me is distributed more in the surface layer portion compared with the inner portion of the active material particles.

Ratio R of the number of the secondary particles with a crack relative to all the secondary particles is preferably 2% or more. The secondary particle of the lithium composite oxide is formed by an aggregation of a plurality of primary particles of the lithium composite oxide.

A section of the crack formed on the secondary particle of the lithium composite oxide is the section of the lithium composite oxide itself. Therefore, element Me is distributed more at the surface layer portion of the active material particles than the section formed by the cracks.

The lithium composite oxide is preferably represented by, $$Li_xM_{1-y}L_yO_2$$

where $0.85 \leq x \leq 1.25$; $0 \leq y \leq 0.50$; element M is at least one selected from the group consisting of Ni and Co; and element L is at least one selected from the group consisting of an alkaline earth element, a transition metal element other than Ni and Co, a rare-earth element, a IIIb group element, and a IVb group element.

The crystal structure of the lithium composite oxide is usually a layered structure (for example, R3m), and oxygens are arranged in the cubic close-packed structure. Element L forms a part of such a crystal structure. That is, element L is incorporated into the lithium composite oxide to form a solid solution.

When $0<y$, element L preferably includes at least one selected from the group consisting of Al, Mn, Ti, Mg, Zr, Nb, Mo, W, Y, Ca, B, Ta, In, and Sn. It is further preferable that element L includes at least one selected from the group consisting of Al, Mn, and Ti.

Generally, element Me and element L have crystal structures different from each other. Element Me preferably forms an oxide at the surface layer portion of the active material particles, and the oxide have a crystal structure different from the lithium composite oxide.

The average particle size of the active material particles is preferably 10 μm or more.

The amount of element Me included in the active material particles is preferably 2 mol % or less relative to the lithium composite oxide. That is, when the lithium composite oxide is represented by $Li_xM_{1-y}L_yO_2$, the amount of element Me is preferably 2 mol % or less relative to the total of element M and element L.

Cracks may be formed on the secondary particles of the lithium composite oxide by various methods. Simple and preferable method is to control the rolling conditions in a manufacturing step of the positive electrode. By setting the gap of the rollers smaller than conventionally set upon rolling the current collector (positive electrode core material) carrying the active material particles with rollers, a great stress is given to the secondary particles, thereby forming cracks on the secondary particles.

Usually, the gap of the rollers is set larger so that an excessive stress is not applied to the secondary particles. The electrode thickness is thus adjusted by repeating the rolling. No crack is generated to the secondary particles in this case.

Effect of the Invention

Element Me distributed more in the surface layer portion of the active material particles compared with the inner portion works to improve safety at the time of shorting. However, since element Me curbs metal elution upon overcharging, it becomes difficult to bring out the effects of the internal short-circuit safety mechanism. On the other hand, when the secondary particles of the lithium composite oxide have cracks (fracture), metals are eluted from the cracks upon overcharging. Thus, the effects of the internal short-circuit safety mechanism are easily brought out.

For securing the effects of the internal short-circuit safety mechanism, element Me may be distributed unevenly on the surface layer portion of the active material particles. For example, element Me may be provided on a portion of the surface layer portion of the active material particles. However, in that case, the lithium composite oxide is exposed on the active material particle surface. Thus, it becomes difficult to improve safety for a short circuit occurrence in a battery by for example a nail-penetration.

When a crack is provided at the secondary particles of the lithium composite oxide, at the time of shorting with which a large current flow is caused, the reactions barely occur at the crack due to concentration polarization. Thus, safety at the time of shorting can also be secured sufficiently. Additionally, due to the small amount of the electrolyte present in the cracks, reactions between the electrolyte and the lithium composite oxide are also curbed.

BRIEF DESCRIPTION OF THE DRAWING

[FIG. 1] A vertical cross section of a cylindrical lithium ion secondary battery of an Example of the present invention.

BEST MODE FOR CARRYING OUT THE INVENTION

A positive electrode is described. The positive electrode includes active material particles described below.

The active material particles include secondary particles of a lithium composite oxide, and the surface layer portion of the active material particles includes predetermined element Me. Element Me is distributed more in the surface layer portion of the active material particles compared with the inner portion. For element Me, at least one selected from the group consisting of Mn, Al, Mg, Ca, Zr, B, W, Nb, Ta, In, Mo, and Sn is used due to the effects of improving safety at the time of shorting. These elements may be included singly in the surface layer portion, or may be included in the surface layer portion in combination.

The secondary particles of the lithium composite oxide are formed by aggregation of a plurality of primary particles. The average particle size of the primary particles is generally 0.1 to 3.0 μm, but not particularly limited.

Some of the active material particles have a crack reaching the inner portion of the secondary particle from the surface layer portion thereof. In other words, some of the secondary particles of the lithium composite oxide have a crack. The presence or absence of the crack may be observed, for example, with an electron microscopes such as SEM and TEM.

Ratio R of the number of the secondary particles with a crack relative to all the secondary particles is not particularly limited. However, ratio R of the number of the secondary particles with a crack is preferably 2% or more on number basis, and further preferably 3.5% or more. For example, any 100 active material particles are observed with an electron microscope, and the number of the particles having a crack reaching the inner portion of the secondary particle from the surface layer portion is counted. At that time, the number of the particles with a crack is preferably 2 or more, and further preferably 3.5 or more relative to 100 particles.

The average particle size of the active material particles is not particularly limited, but for example, 1 to 30 µm is preferable, and 10 to 30 µm is particularly preferable. The average particle size may be determined, for example, with a wet laser diffraction particle size distribution analyzer manufactured by Microtrac, Inc. In this case, the volume-based 50% value (Median Value: $D_{50}$) can be regarded as the average particle size of the active material particles.

The lithium composite oxide is generally represented by:

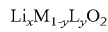

$$Li_xM_{1-y}L_yO_2$$

where $0.85 \leq x \leq 1.25$; $0 \leq y \leq 0.50$; element M is at least one selected from the group consisting of Ni and Co; element L is at least one selected from the group consisting of an alkaline earth element, a transition metal element other than Ni and Co, a rare-earth element, a IIIb group element, and a IVb group element. Element L gives effects of improving thermal stability to the lithium composite oxide.

The lithium composite oxide represented by $Li_xM_{1-y}L_yO_2$ preferably includes at least one selected from the group consisting of Al, Mn, Ti, Mg, Zr, Nb, Mo, W, Y, Ca, B, Ta, In, and Sn as element L. The lithium composite oxide may include, as element L, these elements singly, or in combination of two or more. Among these, Al, Mn, and Ti are suitable as element L. Particularly, Al is preferable in terms of its great effects of improving thermal stability of the lithium composite oxide.

In $Li_xM_{1-y}L_yO_2$, the range of x that shows the Li content increases and decreases by battery charge and discharge. The range of x under completely discharged state (initial state) is preferably $0.85 \leq x \leq 1.25$, and further preferably $0.93 \leq x \leq 1.1$.

The range of y that represents the element L content may be $0 \leq y \leq 0.50$. However, considering the balance between the thermal stability and the capacity of the lithium composite oxide, the range is preferably $0.005 \leq y \leq 0.35$, and further preferably $0.01 \leq y \leq 0.1$. When $0.50 < y$, merits of using the active material mainly composed of Ni or Co, for example, a particular high capacity cannot be achieved.

When element M includes Co, atomic ratio a of Co relative to the total of element M and element L is preferably $0.05 \leq a \leq 0.5$, and further preferably $0.05 \leq a \leq 0.25$.

When element L includes Al, atomic ratio b of Al relative to the total of element M and element L is preferably $0.005 \leq b \leq 0.1$, and further preferably $0.01 \leq b \leq 0.08$.

When element L includes Mn, atomic ratio c of Mn relative to the total of element M and element L is preferably $0.005 \leq c \leq 0.5$, and further preferably $0.01 \leq c \leq 0.35$.

When element L includes Ti, atomic ratio d of Ti relative to the total of element M and element L is preferably $0.005 \leq d \leq 0.35$, and further preferably $0.01 \leq d \leq 0.1$.

The lithium composite oxide represented by $Li_xM_{1-y}L_yO_2$ may be synthesized by baking a raw material having a predetermined metal element ratio in an oxidizing atmosphere. The raw material includes lithium, element M, and as necessary element L. The raw material includes oxides, hydroxides, oxyhydroxides, carbonates, nitrates, and organic complex salts of each of the metal elements. These may be used singly, or may be used in combination of two or more.

For simplifying the synthesis of the lithium composite oxide, the raw material preferably includes a solid solution including a plurality of metal elements. The solid solution including a plurality of metal elements may be formed by any of oxides, hydroxides, oxyhydroxides, carbonates, nitrates, and organic complex salts. For example, a solid solution including Ni and Co; a solid solution including Ni, Co, and Al; a solid solution including Ni, Co, and Mn; and a solid solution including Ni, Co, and Ti, may be used.

The baking temperature of the raw material and the partial pressure of oxygen in the oxidizing atmosphere depend on the composition, amount, and synthesizing device of the raw material, but those skilled in the art may appropriately select suitable conditions.

Elements other than Li, element M, and element L in the amount range that is usually contained in industrial raw materials are sometimes included as impurities, but do not greatly affect the effects of the invention.

Element Me included in the surface layer portion of the active material particles is in the state of oxides or lithium-containing oxides, and is preferably deposited on, attached to, or carried on the lithium composite oxide surface.

Element L incorporated in the lithium composite oxide to form a solid solution and element Me included in the surface layer portion of the active material particles may include or not include the same element. Even when element Me and element L include the same element, due to their different crystal structures, there are distinguished clearly. Element Me is not necessarily incorporated in the lithium composite oxide to form a solid solution. Element Me mainly forms an oxide having a crystal structure different from the lithium composite oxide at the surface layer portion of the active material particles. Element Me and element L may be distinguished by various analysis methods such as element mapping by EPMA (Electron Probe Micro-Analysis), analysis on chemical bond by XPS (X-ray Photoelectron Spectroscopy), and SIMS (Secondary Ionization Mass Spectroscopy).

The amount of element Me included in the active material particles is preferably 2 mol % or less, and further preferably 0.1 mol % or more and 1.5 mol % or less relative to the lithium composite oxide. That is, when the lithium composite oxide is represented by $Li_xM_{1-y}L_yO_2$, the amount of element Me is preferably 2 mol % or less, and further preferably 0.1 mol % or more and 1.5 mol % or less relative to the total of element M and element L. When the amount of element Me exceeds 2 mol %, the surface layer portion of the active material particles works as a resistance layer to raise the overvoltage, thereby decreasing cycle performance. On the other hand, when the amount of element Me is below 0.1 mol %, the exposed portion of the lithium composite oxide increases, sometimes leading to a failure in improving safety at the time of shorting.

Element Me at the surface layer portion sometimes diffuses into the lithium composite oxide to heighten the concentration of element L in the lithium composite oxide at the surface layer portion of the active material particles compared with the inner portion. That is, element Me at the surface layer portion sometimes changes into element L forming the lithium composite oxide. However, element L derived from element Me diffused in the lithium composite oxide is in minute amount and therefore can be ignored. Even though this is ignored, it does not greatly affect the effects of the present invention.

An example of the method of manufacturing the positive electrode is described next.

(i) First Step

A lithium composite oxide is prepared. The preparation method of the lithium composite oxide is not particularly limited. For example, the lithium composite oxide may be synthesized by baking a raw material having a predetermined metal element ratio in an oxidizing atmosphere.

The baking temperature and the partial pressure of oxygen in the oxidizing atmosphere are appropriately selected according to the composition and the amount of the raw material, and the synthesizing device.

(ii) Second Step

On the prepared lithium composite oxide, a raw material of element Me (at least one selected from the group consisting of Mn, Al, Mg, Ca, Zr, B, W, Nb, Ta, In, Mo, and Sn) is carried. The average particle size of the lithium composite oxide is not particularly limited, but for example 10 to 30 μm is preferable. Generally, the amount of element Me relative to the lithium composite oxide can be determined by the raw material amount of element Me used.

For the raw material of element Me, sulfate, nitrates, carbonates, chlorides, hydroxides, oxides, and alkoxides containing element Me may be used. These may be used singly, or may be used in combination of two or more. Among these, in view of battery performance, using sulfate, nitrate, chloride, or alkoxide is particularly preferable. The raw material of element Me may be carried on the lithium composite oxide by any method. For example, a preferable method is to dissolve or disperse the raw material of element Me in a liquid component to prepare a solution or a dispersion; mix this solution or dispersion with a lithium composite oxide; and remove the liquid component.

The liquid component for the raw material of element Me to be dissolved or dispersed is not particularly limited, but ketones such as acetone and methyl ethyl ketone (MEK); ethers such as tetrahydrofuran (THF); alcohols such as ethanol; and other organic solvents are preferable. Alkaline water with pH 10 to 14 is also preferably used.

The temperature of the liquid is not particularly limited upon mixing in the lithium composite oxide to the obtained solution or dispersion and stirring. However, in view of workability and manufacturing costs, the temperature of the liquid is preferably controlled to 20 to 40° C. The stirring time is not particularly limited, but for example, 3 hours of stirring is sufficient. The method for removing the liquid component is not particularly limited, but for example, drying at about a temperature of 100° C. for 2 hours is sufficient.

(iii) Third Step

A lithium composite oxide carrying element Me on the surface thereof is baked at 650 to 750° C. for 2 to 24 hours, preferably for 6 hours, under an oxygen atmosphere. At this time, the pressure of the oxygen atmosphere is preferably 101 to 50 kPa. By this baking, element Me is converted to an oxide having a crystal structure different from the lithium composite oxide.

(iv) Fourth Step

A positive electrode is made by using the active material particles. The method for making the positive electrode is not particularly limited. However, a crack reaching the inner portion of the secondary particle from the surface layer portion thereof has to be made to the active material particles.

Generally, a positive electrode material mixture including active material particles and a binder is first carried on a strip positive electrode core material (positive electrode current collector). To the positive electrode material mixture, an additive such as a conductive material can be also added as an arbitrary component. The positive electrode material mixture is dispersed in a liquid component to prepare a paste, and the paste is applied on the core material and then dried, thereby allowing the positive electrode material mixture to be carried on the core material.

Then, the current collector (positive electrode core material) carrying the positive electrode material mixture was rolled by rollers. Upon rolling, the gap of the rollers is controlled, for example, to give a line pressure of 1000 to 6000 N/cm. By making the gap of the rollers smaller than the conventional gap (for example, by setting a gap to 3 to 10 μm), a high degree of stress is applied to the active material particles. As a result, a crack reaching the inner portion of the secondary particle from the surface layer portion is formed on the active material particles.

For the binder to be included in the positive electrode material mixture, any of a thermoplastic resin and a thermosetting resin may be used, but the thermoplastic resin is preferable. Such thermoplastic resins include, for example, polyethylene, polypropylene, polytetrafluoroethylene (PTFE), polyvinylidene fluoride (PVDF), styrenebutadiene rubber, a tetrafluoroethylene-hexafluoropropylene copolymer (FEP), a tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, an ethylene-methacrylic acid copolymer, an ethylene-methyl acrylate copolymer, and an ethylene-methyl acrylate copolymer may be mentioned. These may be used singly, or may be used in combination of two or more. These may be crosslinked by Na-ions.

The conductive material to be included in the positive electrode material mixture may be any electron conductive material that is chemically stable in the battery. For example, graphites such as natural graphite (such as flake graphite) and artificial graphite; carbon blacks such as acetylene black, ketjen black, channel black, furnace black, lamp black, and thermal black; conductive fibers such as carbon fiber and metal fiber; powders of a metal such as aluminum; conductive whiskers such as zinc oxide and potassium titanate; conductive metal oxides such as titanium oxide; organic conductive materials such as polyphenylene derivative; and carbon fluorides may be used. These may be used singly, or may be used in combination of two or more. The amount of the conductive material to be added is not particularly limited, but preferably 1 to 50 wt %, further preferably 1 to 30 wt %, and particularly preferably 2 to 15 wt % relative to the active material particles included in the positive electrode material mixture.

Any electronic conductor may be used for the positive electrode core material (positive electrode current collector), as long as it is chemically stable in the battery. For example, foil or sheet of aluminum, stainless steel, nickel, titanium, carbon, and conductive resin may be used. Particularly, aluminum foil and aluminum alloy foil are preferable. On the foil or sheet surface, a carbon or titanium layer may be given, and an oxide layer may be formed as well. The foil or sheet surface may be made uneven. A net, a punched sheet, a lath material, a porous material, a formed material, and a fibrous molded material may also be used. The thickness of the positive electrode core material is not particularly limited, but for example, in the range of 1 to 500 μm.

In the following, elements other than the positive electrode of the lithium ion secondary battery of the present invention are described. However, the following description does not limit the present invention.

May be used as the negative electrode capable of charging and discharging lithium, for example, is a negative electrode material mixture containing a negative electrode active material and a binder, and arbitrary components such as a conductive material and a thickener; and being carried on the negative electrode core material. Such a negative electrode may be made in the same manner as the positive electrode.

Any material capable of electrochemically charging and discharging lithium may be used as the negative electrode active material. For example, graphites; non-graphitizable carbon materials; lithium alloys; and metal oxides may be used. The lithium alloy is preferably an alloy including at least one selected from the group consisting of silicon, tin, aluminum, zinc, and magnesium. For the metal oxide, an oxide containing silicon and an oxide containing tin are preferable, and those are further preferably hybridized with a carbon material. The average particle size of the negative electrode active material is not particularly limited, but preferably 1 to 30 μm.

For the binder to be included in the negative electrode material mixture, any of a thermoplastic resin and a thermosetting resin may be used, but the thermoplastic resin is preferable. Such a thermoplastic resin includes, for example, polyethylene, polypropylene, polytetrafluoroethylene (PTFE), polyvinylidene fluoride (PVDF), styrenebutadiene rubber, a tetrafluoroethylene-hexafluoropropylene copolymer (FEP), a tetrafluoroethylene-perfluoroalkylvinylether copolymer (PFA), a vinylidene fluoride-hexafluoropropylene copolymer, a vinylidene fluoride-chlorotrifluoroethylene copolymer, an ethylene-tetrafluoroethylene copolymer (ETFE), polychlorotrifluoroethylene (PCTFE), a vinylidene fluoride-pentafluoropropylene copolymer, a propylene-tetrafluoroethylene copolymer, an ethylene-chlorotrifluoroethylene copolymer (ECTFE), a vinylidene fluoride-hexafluoropropylene-tetrafluoroethylene copolymer, a vinylidene fluoride-perfluoromethylvinylether-tetrafluoroethylene copolymer, an ethylene-acrylic acid copolymer, an ethylene-methacrylic acid copolymer, an ethylene-methyl acrylate copolymer, and an ethylene-methyl methacrylate copolymer. These may be used singly, or may be used in combination of two or more. These may be crosslinked by Na-ions.

The conductive material to be included in the negative electrode material mixture may be any electron conductive material, as long as it is chemically stable in the battery. For example, graphites such as natural graphite (such as flake graphite) and artificial graphite; carbon blacks such as acetylene black, ketjen black, channel black, furnace black, lamp black, and thermal black; conductive fibers such as carbon fiber and metal fiber; powders of metals such as copper and nickel; and organic conductive materials such as polyphenylene derivative may be used. These may be used singly, or may be used in combination of two or more. The amount of the conductive material to be added is not particularly limited, but preferably 1 to 30 wt %, and further preferably 1 to 10 wt % relative to the active material particles to be included in the negative electrode material mixture.

The negative electrode core material (negative electrode current collector) may be any electron conductive material, as long as it is chemically stable in the battery. For example, foil or sheet of stainless steel, nickel, copper, titanium, carbon, and conductive resin may be used. Copper foil or copper alloy foil is particularly preferable. On the foil or sheet surface, a layer of carbon, titanium, and nickel may be formed, and an oxide layer may be formed as well. The foil or sheet surface may be made uneven. A net, a punched sheet, a lath material, a porous material, a formed material, and a fibrous molded material may also be used. Thickness of the negative electrode core material is not particularly limited, but for example, in the range of 1 to 500 μm.

For the non-aqueous electrolyte, a non-aqueous solvent dissolving a lithium salt therein is preferably used.

For the non-aqueous solvent, for example, cyclic carbonates such as ethylene carbonate (EC), propylene carbonate (PC), and butylene carbonate (BC); chain carbonates such as dimethyl carbonate (DMC), diethyl carbonate (DEC), ethyl methyl carbonate (EMC), and dipropyl carbonate (DPC); aliphatic carboxylic acid esters such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; dimethylsulfoxide; 1,3-dioxolane; formamide; acetamide; dimethylformamide; dioxolane; acetonitrile; propylnitrile; nitromethane; ethyl monoglyme; phosphoric acid triester; trimethoxymethane; dioxolane derivatives; sulfolane; methyl sulfolane; 1,3-dimethyl-2-imidazolidinone; 3-methyl-2-oxazolidinone; propylene carbonate derivatives; tetrahydrofuran derivatives; ethyl ether; 1,3-propane sultone; anisole; dimethylsulfoxide; and N-methyl-2-pyrrolidone may be used. These may be used singly, but preferably used in combination of two or more. Particularly, a solvent mixture of cyclic carbonate and chain carbonate, or a solvent mixture of cyclic carbonate, chain carbonate, and aliphatic carboxylic acid ester is preferable.

For the lithium salt to be dissolved in the non-aqueous solvent, for example, $LiCl_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, chloroborane lithium, lithium tetraphenylborate, and lithium imide salt may be mentioned. These may be used singly, or may be used in combination of two or more, but preferably at least $LiPF_6$ is used. The amount of the lithium salt to be dissolved relative to the non-aqueous solvent is not particularly limited, but the lithium salt concentration is preferably 0.2 to 2 mol/L, and further preferably 0.5 to 1.5 mol/L.

To the non-aqueous electrolyte, for the purpose of improving battery charge and discharge performance, various additives may be added. For the additive, for example, at least one selected from the group consisting of vinylene carbonate, vinylethylene carbonate, phosphazene, and fluorobenzene is used. The appropriate amount of these additives contained is 0.5 to 10 wt % relative to the non-aqueous electrolyte.

Other various additives, for example, triethyl phosphite, triethanol amine, cyclic ether, ethylenediamine, n-glyme, pyridine, triamide hexaphosphate, nitrobenzene derivatives, crown ethers, quaternary ammonium salts, and ethylene glycol dialkylether may also be used.

A separator needs to be interposed between the positive electrode and the negative electrode.

Preferably used for the separator is a microporous thin film having a high ion-permeability, a predetermined mechanical strength, and electrical insulation. The microporous thin film preferably functions to close the pores at a predetermined temperature or more, to increase resistance. For the microporous thin film material, preferably used are polyolefins such as polypropylene and polyethylene excellent in resistance to organic solvents and having hydrophobicity. A sheet made of glass fiber, and nonwoven fabric or woven fabric are also used. The pore size of the separator is, for example, 0.01 to 1 μm. The thickness of the separator is, generally 10 to 300 μm The porosity of the separator is generally 30 to 80%.

A polymer electrolyte including a non-aqueous liquid electrolyte and a polymer material retaining the non-aqueous liquid electrolyte may be used as a separator by integrating with the positive electrode or the negative electrode. Any polymer material may be used, as long as it can retain the non-aqueous liquid electrolyte, but particularly, a copolymer of vinylidene fluoride and hexafluoropropylene is preferable.

Example 1

Example Battery A1

(1) Synthesizing Lithium Composite Oxide

Nickel sulfate, cobalt sulfate, and aluminum sulfate were mixed so that the molar ratio between Ni atoms, Co atoms, and Al atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Al coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co—Al lithium composite oxide containing Ni and Co as element M, and Al as element L ($LiNi_{0.8}Co_{0.15}Al_{0.05}O_2$) was obtained. As the obtained lithium composite oxide was observed with an electron microscope, it was found that primary particles were aggregated to form secondary particles. The primary particles were aggregated to form secondary particles in the following Example Batteries and Comparative Example Batteries as well.

(2) Synthesizing Active Material Particles

<i> First Step

In a solution dissolving niobium chloride in 10 L of ethanol, 2 kg of the synthesized lithium composite oxide was dispersed. The amount of niobium chloride used was set to 0.5 mol % relative to the lithium composite oxide. The ethanol solution in which the lithium composite oxide was dispersed was stirred at 25° C. for 3 hours; the solution was filtrated; and its solid content was dried at 100° C. for 2 hours. As a result, a lithium composite oxide carrying niobium (Nb) as element Me on the surface thereof was obtained.

<ii> Second Step

The dried powder was preliminary baked first at 300° C. for 6 hours under a dry air atmosphere (humidity 19%, pressure 101 kPa).

Then, the preliminary baked powder was baked at 650° C. for 6 hours under an atmosphere of 100% oxygen (pressure 101 kPa).

Lastly, the powder after the main baking was annealed at 400° C. under an atmosphere of 100% oxygen (pressure 101 KPa) for 4 hours.

By this baking, active material particles containing secondary particles of the lithium composite oxide and containing Nb at the surface layer portion (with an average particle size of 12 μm) was obtained.

The presence of Nb was confirmed by XPS, EPMA, or ICP emission analysis. In the following Examples as well, similarly, the presence of element Me in the active material particles was confirmed by XPS, EMPA, or ICP emission analysis.

(3) Preparation of Positive Electrode

A positive electrode material mixture paste was prepared by stirring 1 kg of the obtained active material particles along with 0.5 kg of PVDF#1320 (a N-methyl-2-pyrrolidone (NMP) solution with a solid content of 12 wt %) manufactured by Kureha Corporation, 40 g of acetylene black, and an appropriate amount of NMP using a double-armed kneader. This paste was applied on both sides of an aluminum foil with a thickness of 20 μm (positive electrode core material: current collector) and dried.

Afterwards, the current collector carrying the positive electrode material mixture was rolled only once with rollers with a gap of 5 μm, to obtain a positive electrode plate with a total thickness of 160 μm. Then, the obtained positive electrode plate was slit to give a width that can be inserted into a cylindrical type 18650 battery case, to obtain a positive electrode.

From a portion of the positive electrode plate, the positive electrode material mixture was scratched off, and washed to separate only the active material particles. As the separated active material particles were analyzed with SEM, in particles of 2% or more by number basis, a crack reaching the inner portion of the secondary particle from the surface layer portion was generated. In Example Batteries below as well, in particles of 2% to 5% by number basis, a crack reaching the inner portion of the secondary particle from the surface layer portion was generated.

(4) Negative Electrode Preparation

A negative electrode material mixture paste was prepared by stirring 3 kg of artificial graphite, 200 g of BM-400B manufactured by Zeon Corporation (a dispersion of modified styrene-butadiene rubber with a solid content of 40 wt %), 50 g of carboxymethyl cellulose (CMC), and appropriate amount of water with a double-armed kneader. This paste was applied on both sides of copper foil with a thickness of 12 μm (negative electrode core material: current collector), dried, and rolled to give a total thickness of 160 μm. Then, the obtained negative electrode plate was slit to give a width that can be inserted into a cylindrical 18650 battery case, thereby obtaining a negative electrode.

(5) Battery Assembly

As shown in FIG. 1, a positive electrode 5 and a negative electrode 6 were wound with a separator 7 interposed therebetween, to form a wound electrode assembly. For the separator 7, a composite film of polyethylene and polypropylene (2300 manufactured by Celgard Inc., thickness of 25 μm) was used.

To the positive electrode 5 and the negative electrode 6, a nickel-made positive electrode lead 5a and a nickel-made negative electrode lead 6a were attached, respectively. An upper insulating plate 8a was disposed at the upper face, and a lower insulating plate 8b was disposed at the lower face of the electrode assembly; the assembly with the insulating plates was inserted in a battery case 1; and 5 g of a non-aqueous electrolyte was injected in the battery case 1.

Used for the non-aqueous electrolyte was a solvent mixture of ethylene carbonate and methyl ethyl carbonate with a volume ratio of 10:30, dissolving $LiPF_6$ with a concentration of 1.5 mol/L.

Then, a sealing plate 2 with an insulating gasket 3 disposed on the periphery thereof, and the positive electrode lead 5a were electrically connected, and the opening of the battery case 1 was sealed with the sealing plate 2. A cylindrical 18650 lithium secondary battery was thus completed. This was named as Example Battery A1.

Example Battery A2

Battery A2 was made in the same manner as battery A1, except that the amount of niobium chloride dissolved in 10 L of ethanol was changed to 2.0 mol % relative to the lithium composite oxide.

Example Battery A3

Instead of the ethanol solution of niobium chloride, kg of a lithium composite oxide was dispersed in 1 L of an aqueous solution of sodium hydroxide with pH13. To the obtained dispersion, an aqueous solution in which 0.5 mol % of manganese sulfate (Mn) relative to the lithium composite oxide was dissolved in 100 g of distilled water was dropped in 10 minutes, and then stirred at 100° C. for 3 hours. Except for the above, battery A3 was made in the same manner as battery A1.

Example Battery A4

Battery A4 was made in the same manner as battery A3, except that the amount of manganese sulfate dissolved in 100 g of distilled water was changed to 2.0 mol % relative to the lithium composite oxide.

Example Battery A5

To a solution dissolving pentaethoxytantalum (Ta) in 10 L of ethanol, 2 kg of the synthesized lithium composite oxide was dispersed. The amount of pentaethoxytantalum used was set to 0.5 mol % relative to the lithium composite oxide. Battery A5 was made in the same manner as battery A1, except that ethanol solution in which the lithium composite oxide was dispersed was stirred at 60° C. for 3 hours.

Example Battery A6

Battery A6 was made in the same manner as battery A5, except that the amount of pentaethoxytantalum dissolved in 10 L of ethanol was changed to 2.0 mol % relative to the lithium composite oxide.

Example Battery A7

Battery A7 was made in the same manner as battery A3, except that manganese sulfate was changed to disodium molybdate (Mo) dihydrate.

Example Battery A8

Battery A8 was made in the same manner as battery A7, except that the amount of disodium molybdate dihydrate dissolved in 100 g of distilled water was changed to 2.0 mol % relative to the lithium composite oxide.

Example Battery A9

Battery A9 was made in the same manner as battery A5, except that instead of the ethanol solution of pentaethoxytantalum, a solution dissolving indium nitrate (In) in 1 L of ethanol was used. The amount of indium nitrate used was set to 0.5 mol % relative to the lithium composite oxide.

Example Battery A10

Battery A10 was made in the same manner as battery A9, except that the amount of indium nitrate dissolved in 1 L of ethanol was changed to 2.0 mol % relative to the lithium composite oxide.

Example Battery A11

Battery A11 was made in the same manner as battery A3, except that manganese sulfate was changed to tin sulfate (Sn).

Example Battery A12

Battery A12 was made in the same manner as battery A11, except that the amount of tin sulfate dissolved in 100 g of distilled water was changed to 2.0 mol % relative to the lithium composite oxide.

Example Battery A13

Battery A13 was made in the same manner as battery A3, except that manganese sulfate was changed to sodium tungstate (W).

Example Battery A14

Battery A14 was made in the same manner as battery A13, except that the amount of sodium tungstate dissolved in 100 g of distilled water was changed to 2.0 mol % relative to the lithium composite oxide.

Example Battery A15

Battery A15 was made in the same manner as battery A5, except that a solution dissolving aluminum (Al) triisopropoxide in 10 L of isopropanol was used instead of the ethanol solution of pentaethoxytantalum. The amount of aluminum triisopropoxide used was set to 0.5 mol % relative to the lithium composite oxide.

Example Battery A16

Battery A16 was made in the same manner as battery A15, except that the amount of aluminum triisopropoxide dissolved in 10 L of isopropanol was changed to 2.0 mol % relative to the lithium composite oxide.

Example Battery 17

Battery A17 was made in the same manner as battery A5, except that instead of the ethanol solution of pentaethoxytantalum, a solution dissolving zirconium (Zr) tetra-n-butoxide in 10 L of butanol was used. The amount of zirconium tetra-n-butoxide used was set to 0.5 mol % relative to the lithium composite oxide.

Example Battery A18

Battery A18 was made in the same manner as battery A17, except that the amount of zirconium tetra-n-butoxide to be dissolved in 10 L of butanol was changed to 2.0 mol % relative to the lithium composite oxide.

Example Battery A19

Battery A19 was made in the same manner as battery A5, except that a solution dissolving magnesium (Mg) acetate in 1 L of ethanol was used instead of the ethanol solution of pentaethoxytantalum. The amount of magnesium acetate used was set to 0.5 mol % relative to the lithium composite oxide.

Example Battery A20

Battery A20 was made in the same manner as battery A19, except that the amount of magnesium acetate dissolved in 1 L of ethanol was changed to 2.0 mol % relative to the lithium composite oxide.

Example Battery A21

Battery A21 was made in the same manner as battery A3, except that manganese sulfate was changed to boric (B) acid.

Example Battery A22

Battery A22 was made in the same manner as battery A21, except that the amount of boric acid dissolved in 100 g of distilled water was changed to 2.0 mol % relative to the lithium composite oxide.

Example Battery A23

Battery A23 was made in the same manner as battery A5, except that a solution dissolving calcium (Ca) oleate in 1 L of ethanol was used instead of the ethanol solution of pentaethoxytantalum. The amount of calcium oleate used was set to 0.5 mol % relative to the lithium composite oxide.

Example Battery A24

Battery A24 was made in the same manner as battery A23, except that the amount of calcium oleate dissolved in 1 L of ethanol was changed to 2.0 mol % relative to the lithium composite oxide.

Comparative Example Batteries a1 to a24

Upon manufacturing the positive electrode, a positive electrode plate was obtained by applying a positive electrode material mixture paste on both sides of aluminum foil with a thickness of 20 μm, and drying; and rolling the current collector carrying the positive electrode material mixture three to four times until the total thickness becomes 160 μm with rollers having a gap of 15 μm. Batteries a1 to a24 were made in the same manner as batteries A1 to A24, respectively, except for the above.

The positive electrode material mixture was scratched off from a portion of the positive electrode and washed to separate only the active material particles. The separated active material particles were analyzed with SEM, and it was found that no particles with the crack reaching the inner portion of the secondary particle from the surface layer portion was present. No such cracks were found in Comparative Example Batteries below as well.

Example 2

Example Batteries B1 to B24

Nickel sulfate, cobalt sulfate, and manganese sulfate were mixed so that the molar ratio between Ni atoms, Co atoms, and Mn atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Mn coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a lithium composite oxide containing Co and Mn as element M ($LiNi_{0.8}CO_{0.15}Mn_{0.05}O_2$) with an average particle size 12 μm was obtained. Batteries B1 to B24 were made in the same manner as Batteries A1 to A24, respectively, except that the obtained lithium composite oxide was used.

Comparative Example Batteries b1 to b24

Upon manufacturing the positive electrode, a positive electrode plate was obtained by applying a positive electrode material mixture paste on aluminum foil with a thickness of 20 μm and drying; and rolling the current collector carrying the positive electrode material mixture three to four times with rollers with a gap of 15 μm to give a total thickness of 160 μm. Except for the above, batteries b1 to b24 were made in the same manner as batteries B1 to B24, respectively.

Example 3

Example Batteries C1 to C24

Nickel sulfate, cobalt sulfate, and manganese sulfate were mixed so that the molar ratio between Ni atoms, Co atoms, and Mn atoms was 34:33:33. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Mn coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a lithium composite oxide containing Co and Mn as element M and having an average particle size of 12 μm ($LiNi_{0.34}CO_{0.33}Mn_{0.33}O_2$) was obtained. Batteries C1 to C24 were made in the same manner as batteries A1 to A24, respectively, except that the obtained lithium composite oxide was used.

Comparative Example Batteries c1 to c24

Upon manufacturing the positive electrode, a positive electrode plate was obtained by applying a positive electrode material mixture paste on aluminum foil with a thickness of 20 μm and drying; and rolling the current collector carrying the positive electrode material mixture three to four times with rollers with a gap of 15 μm to give a total thickness of 160 μm. Except for the above, in the same manner as batteries C1 to C24, batteries c1 to c24 were made, respectively.

Example 4

Example Batteries D1 to D24

Nickel sulfate, cobalt sulfate, and titanium nitrate were mixed so that the molar ratio between Ni atoms, Co atoms, and Ti atoms was 80:15:5. A raw material solution was obtained by dissolving 3.2 kg of this mixture in 10 L of water. To the raw material solution, 400 g of sodium hydroxide was added, to produce a precipitate. The precipitate was washed sufficiently with water and dried, thereby obtaining a coprecipitated hydroxide.

To 3 kg of the obtained Ni—Co—Ti coprecipitated hydroxide, 784 g of lithium hydroxide was mixed, and the mixture was baked under a partial pressure of oxygen of 0.5 atmosphere, with a synthesizing temperature of 750° C. for 10 hours. As a result, a Ni—Co—Ti lithium composite oxide containing Co and Ti as element M and having an average particle size of 11 μm ($LiNi_{0.80}Co_{0.15}Ti_{0.05}O_2$) was obtained. Batteries D1 to D24 were made in the same manner as batteries A1 to A24, respectively, except that the obtained lithium composite oxide was used.

Comparative Example Batteries d1 to d24

Upon manufacturing the positive electrode, a positive electrode plate was obtained by applying a positive electrode material mixture paste on aluminum foil with a thickness of 20 μm and drying; and rolling the current collector carrying the positive electrode material mixture three to four times with rollers with a gap of 15 μm to give a total thickness of 160 μm. Except for the above, in the same manner as batteries D1 to D24, batteries d1 to d24 were made, respectively.

[Evaluation]

Batteries thus made was evaluated as in below.

(Short Circuit Safety)

Test batteries (capacity: 2000 mAh) were charged as in below.

Constant Current Charge: Current 1400 mA (0.7 C), End Voltage 4.25 V

Constant Voltage Charge: Voltage 4.25 V, End Current 100 mA (0.05 C)

An iron-made round nail with a diameter of 2.7 mm was penetrated on the side of the charged battery under an environment of 20° C. with a speed of 180 mm/sec, to observe the heat generation in the battery. The temperature reached after 90 seconds in the vicinity of the penetration area of the battery is shown in Tables 1A to 4A and 1B to 4B.

(Overcharging Safety)

Test battery (capacity: 2000 mAh) was overcharged at a current of 8000 mA (4 C), and with a maximum application voltage of 10 V, to observe the heat generation of the battery. The highest temperature reached at the side of the battery is shown in Tables 1A to 4A and 1B to 4B.

TABLE 1A

Lithium Composite Oxide: $LiNi_{0.80}Co_{0.15}Al_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| A | 1 | Nb | 0.5 | 71 | 92 |
|   | 2 |    | 2.0 | 70 | 90 |
|   | 3 | Mn | 0.5 | 73 | 92 |
|   | 4 |    | 2.0 | 71 | 91 |
|   | 5 | Ta | 0.5 | 69 | 92 |
|   | 6 |    | 2.0 | 71 | 92 |
|   | 7 | Mo | 0.5 | 75 | 92 |
|   | 8 |    | 2.0 | 71 | 92 |
|   | 9 | In | 0.5 | 70 | 92 |
|   | 10 |   | 2.0 | 72 | 92 |
|   | 11 | Sn | 0.5 | 68 | 90 |
|   | 12 |   | 2.0 | 72 | 90 |
|   | 13 | W | 0.5 | 70 | 91 |
|   | 14 |   | 2.0 | 72 | 91 |
|   | 15 | Al | 0.5 | 70 | 90 |
|   | 16 |   | 2.0 | 70 | 97 |
|   | 17 | Zr | 0.5 | 71 | 92 |
|   | 18 |   | 2.0 | 65 | 92 |
|   | 19 | Mg | 0.5 | 70 | 92 |
|   | 20 |   | 2.0 | 78 | 90 |
|   | 21 | B | 0.5 | 80 | 90 |
|   | 22 |   | 2.0 | 68 | 92 |

TABLE 1A-continued

Lithium Composite Oxide: $LiNi_{0.80}Co_{0.15}Al_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
|   | 23 | Ca | 0.5 | 71 | 90 |
|   | 24 |    | 2.0 | 65 | 90 |

TABLE 1B

Lithium Composite Oxide: $LiNi_{0.80}Co_{0.15}Al_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| a | 1 | Nb | 0.5 | 137 | 166 |
|   | 2 |    | 2.0 | 132 | 162 |
|   | 3 | Mn | 0.5 | 120 | 160 |
|   | 4 |    | 2.0 | 132 | 165 |
|   | 5 | Ta | 0.5 | 137 | 150 |
|   | 6 |    | 2.0 | 149 | 149 |
|   | 7 | Mo | 0.5 | 132 | 150 |
|   | 8 |    | 2.0 | 133 | 164 |
|   | 9 | In | 0.5 | 133 | 152 |
|   | 10 |   | 2.0 | 132 | 155 |
|   | 11 | Sn | 0.5 | 135 | 159 |
|   | 12 |   | 2.0 | 138 | 167 |
|   | 13 | W | 0.5 | 139 | 150 |
|   | 14 |   | 2.0 | 141 | 160 |
|   | 15 | Al | 0.5 | 140 | 162 |
|   | 16 |   | 2.0 | 138 | 155 |
|   | 17 | Zr | 0.5 | 130 | 152 |
|   | 18 |   | 2.0 | 144 | 153 |
|   | 19 | Mg | 0.5 | 132 | 155 |
|   | 20 |   | 2.0 | 145 | 152 |
|   | 21 | B | 0.5 | 138 | 150 |
|   | 22 |   | 2.0 | 139 | 157 |
|   | 23 | Ca | 0.5 | 150 | 157 |
|   | 24 |   | 2.0 | 149 | 157 |

TABLE 2A

Lithium Composite Oxide: $LiNi_{0.80}Co_{0.15}Al_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| B | 1 | Nb | 0.5 | 70 | 92 |
|   | 2 |    | 2.0 | 71 | 90 |
|   | 3 | Mn | 0.5 | 80 | 90 |
|   | 4 |    | 2.0 | 68 | 92 |
|   | 5 | Ta | 0.5 | 73 | 90 |
|   | 6 |    | 2.0 | 70 | 90 |
|   | 7 | Mo | 0.5 | 70 | 90 |

TABLE 2A-continued

Lithium Composite Oxide: $LiNi_{0.80}Co_{0.15}Al_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| | 8 | | 2.0 | 69 | 92 |
| | 9 | In | 0.5 | 70 | 92 |
| | 10 | | 2.0 | 65 | 92 |
| | 11 | Sn | 0.5 | 68 | 92 |
| | 12 | | 2.0 | 65 | 90 |
| | 13 | W | 0.5 | 78 | 92 |
| | 14 | | 2.0 | 72 | 92 |
| | 15 | Al | 0.5 | 71 | 92 |
| | 16 | | 2.0 | 70 | 91 |
| | 17 | Zr | 0.5 | 72 | 91 |
| | 18 | | 2.0 | 71 | 92 |
| | 19 | Mg | 0.5 | 71 | 90 |
| | 20 | | 2.0 | 75 | 97 |
| | 21 | B | 0.5 | 71 | 92 |
| | 22 | | 2.0 | 71 | 92 |
| | 23 | Ca | 0.5 | 70 | 91 |
| | 24 | | 2.0 | 72 | 90 |

TABLE 2B

Lithium Composite Oxide: $LiNi_{0.80}Co_{0.15}Mn_{0.05}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| b | 1 | Nb | 0.5 | 138 | 160 |
| | 2 | | 2.0 | 120 | 152 |
| | 3 | Mn | 0.5 | 140 | 162 |
| | 4 | | 2.0 | 149 | 165 |
| | 5 | Ta | 0.5 | 132 | 150 |
| | 6 | | 2.0 | 130 | 155 |
| | 7 | Mo | 0.5 | 132 | 155 |
| | 8 | | 2.0 | 145 | 164 |
| | 9 | In | 0.5 | 133 | 152 |
| | 10 | | 2.0 | 144 | 159 |
| | 11 | Sn | 0.5 | 132 | 166 |
| | 12 | | 2.0 | 138 | 150 |
| | 13 | W | 0.5 | 132 | 167 |
| | 14 | | 2.0 | 137 | 155 |
| | 15 | Al | 0.5 | 150 | 150 |
| | 16 | | 2.0 | 133 | 150 |
| | 17 | Zr | 0.5 | 137 | 157 |
| | 18 | | 2.0 | 138 | 162 |
| | 19 | Mg | 0.5 | 139 | 160 |
| | 20 | | 2.0 | 149 | 153 |
| | 21 | B | 0.5 | 141 | 152 |
| | 22 | | 2.0 | 139 | 149 |
| | 23 | Ca | 0.5 | 135 | 157 |
| | 24 | | 2.0 | 132 | 157 |

TABLE 3A

Lithium Composite Oxide: $LiNi_{0.34}Co_{0.33}Mn_{0.33}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| C | 1 | Nb | 0.5 | 55 | 72 |
| | 2 | | 2.0 | 54 | 73 |
| | 3 | Mn | 0.5 | 57 | 77 |
| | 4 | | 2.0 | 58 | 73 |
| | 5 | Ta | 0.5 | 57 | 72 |
| | 6 | | 2.0 | 59 | 78 |
| | 7 | Mo | 0.5 | 60 | 68 |
| | 8 | | 2.0 | 65 | 61 |
| | 9 | In | 0.5 | 56 | 67 |
| | 10 | | 2.0 | 57 | 73 |
| | 11 | Sn | 0.5 | 53 | 76 |
| | 12 | | 2.0 | 65 | 74 |
| | 13 | W | 0.5 | 67 | 75 |
| | 14 | | 2.0 | 61 | 71 |
| | 15 | Al | 0.5 | 62 | 73 |
| | 16 | | 2.0 | 64 | 72 |
| | 17 | Zr | 0.5 | 54 | 72 |
| | 18 | | 2.0 | 57 | 72 |
| | 19 | Mg | 0.5 | 52 | 78 |
| | 20 | | 2.0 | 65 | 71 |
| | 21 | B | 0.5 | 62 | 72 |
| | 22 | | 2.0 | 66 | 74 |
| | 23 | Ca | 0.5 | 66 | 73 |
| | 24 | | 2.0 | 67 | 71 |

TABLE 3B

Lithium Composite Oxide: $LiNi_{0.34}Co_{0.33}Mn_{0.33}O_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| c | 1 | Nb | 0.5 | 112 | 125 |
| | 2 | | 2.0 | 118 | 127 |
| | 3 | Mn | 0.5 | 117 | 128 |
| | 4 | | 2.0 | 116 | 129 |
| | 5 | Ta | 0.5 | 115 | 122 |
| | 6 | | 2.0 | 119 | 122 |
| | 7 | Mo | 0.5 | 120 | 129 |
| | 8 | | 2.0 | 111 | 129 |
| | 9 | In | 0.5 | 114 | 120 |
| | 10 | | 2.0 | 112 | 128 |
| | 11 | Sn | 0.5 | 118 | 128 |
| | 12 | | 2.0 | 117 | 127 |
| | 13 | W | 0.5 | 113 | 127 |
| | 14 | | 2.0 | 114 | 129 |
| | 15 | Al | 0.5 | 111 | 129 |
| | 16 | | 2.0 | 119 | 122 |
| | 17 | Zr | 0.5 | 111 | 127 |
| | 18 | | 2.0 | 117 | 122 |
| | 19 | Mg | 0.5 | 118 | 120 |
| | 20 | | 2.0 | 111 | 123 |
| | 21 | B | 0.5 | 112 | 122 |
| | 22 | | 2.0 | 111 | 129 |
| | 23 | Ca | 0.5 | 110 | 127 |
| | 24 | | 2.0 | 110 | 127 |

TABLE 4A

Lithium Composite Oxide: LiNi$_{0.80}$Co$_{0.15}$Ti$_{0.05}$O$_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| D | 1 | Nb | 0.5 | 70 | 92 |
|   | 2 |    | 2.0 | 70 | 91 |
|   | 3 | Mn | 0.5 | 70 | 91 |
|   | 4 |    | 2.0 | 78 | 92 |
|   | 5 | Ta | 0.5 | 72 | 91 |
|   | 6 |    | 2.0 | 71 | 92 |
|   | 7 | Mo | 0.5 | 70 | 92 |
|   | 8 |    | 2.0 | 70 | 90 |
|   | 9 | In | 0.5 | 70 | 90 |
|   | 10 |   | 2.0 | 69 | 92 |
|   | 11 | Sn | 0.5 | 65 | 90 |
|   | 12 |    | 2.0 | 68 | 92 |
|   | 13 | W  | 0.5 | 75 | 97 |
|   | 14 |    | 2.0 | 71 | 92 |
|   | 15 | Al | 0.5 | 65 | 92 |
|   | 16 |    | 2.0 | 73 | 90 |
|   | 17 | Zr | 0.5 | 80 | 90 |
|   | 18 |    | 2.0 | 72 | 92 |
|   | 19 | Mg | 0.5 | 72 | 90 |
|   | 20 |    | 2.0 | 71 | 90 |
|   | 21 | B  | 0.5 | 71 | 92 |
|   | 22 |    | 2.0 | 71 | 90 |
|   | 23 | Ca | 0.5 | 68 | 92 |
|   | 24 |    | 2.0 | 71 | 92 |

TABLE 4B

Lithium Composite Oxide: LiNi$_{0.80}$Co$_{0.15}$Ti$_{0.05}$O$_2$

| Battery No. | | Element Me | Amount Added (mol %) | Internal Short Circuit Safety Nail Speed 180 mm/sec Highest Temperature Reached (° C.) | Overcharging Safety 4C mA Highest Temperature Reached (° C.) |
|---|---|---|---|---|---|
| d | 1 | Nb | 0.5 | 140 | 162 |
|   | 2 |    | 2.0 | 132 | 150 |
|   | 3 | Mn | 0.5 | 149 | 165 |
|   | 4 |    | 2.0 | 138 | 150 |
|   | 5 | Ta | 0.5 | 133 | 152 |
|   | 6 |    | 2.0 | 132 | 157 |
|   | 7 | Mo | 0.5 | 137 | 155 |
|   | 8 |    | 2.0 | 133 | 150 |
|   | 9 | In | 0.5 | 130 | 155 |
|   | 10 |   | 2.0 | 144 | 159 |
|   | 11 | Sn | 0.5 | 132 | 155 |
|   | 12 |    | 2.0 | 139 | 149 |
|   | 13 | W  | 0.5 | 138 | 162 |
|   | 14 |    | 2.0 | 135 | 157 |
|   | 15 | Al | 0.5 | 132 | 167 |
|   | 16 |    | 2.0 | 120 | 152 |
|   | 17 | Zr | 0.5 | 150 | 150 |
|   | 18 |    | 2.0 | 137 | 157 |
|   | 19 | Mg | 0.5 | 141 | 152 |
|   | 20 |    | 2.0 | 149 | 153 |
|   | 21 | B  | 0.5 | 145 | 164 |
|   | 22 |    | 2.0 | 132 | 166 |
|   | 23 | Ca | 0.5 | 139 | 160 |
|   | 24 |    | 2.0 | 138 | 160 |

Evaluations were also carried out for lithium composite oxides using various raw materials instead of the above Ni—Co—Al coprecipitated hydroxide, but description is omitted.

INDUSTRIAL APPLICABILITY

The present invention is useful in lithium ion secondary batteries including a lithium composite oxide as the positive electrode active material, and can achieve both safety at the time of shorting, and safety at the time of overcharging.

The form of the lithium ion secondary battery of the present invention is not particularly limited, and can be any of for example a coin-type, a button-type, a sheet-type, a cylindrical-type, a flat-type, and a prismatic-type. The embodiment of the electrode assembly comprising a positive electrode, a negative electrode, and a separator may be a wound-type or a stack-type. The battery size may be small, for usage for small portable devices, or may be large, for usage for electric vehicles.

The lithium ion secondary battery of the present invention may be used for, for example, a power source for personal data assistants, mobile electronic devices, small-size household electrical energy storage devices, motorcycles, electric vehicles, and hybrid electric vehicles. However, its application is not particularly limited.

The invention claimed is:

1. A lithium ion secondary battery comprising: a positive electrode capable of charging and discharging; a negative electrode capable of charging and discharging; and a non-aqueous electrolyte,
    wherein said positive electrode includes active material particles, said active material particles include secondary particles of a lithium composite oxide, having a surface layer portion, said lithium composite oxide is represented by Li$_x$M$_{1-y}$L$_y$O$_2$, where $0.85 \leq x \leq 1.25$; $0.005 \leq y \leq 0.35$; element M includes Ni and Co; element L is at least one selected from the group consisting of an alkaline earth element, a transition metal element other than Ni and Co, a rare-earth element, a IIIb group element, and a IVb group element,
    wherein, an atomic ratio a of Co relative to the total of said element M and said element L is $0.05 \leq a \leq 0.25$,
    wherein, said secondary particles include a secondary particle with a crack which reaches an inner portion of the secondary particle from the surface layer portion and a secondary particle without a crack,
    wherein, a ratio R of the number of said secondary particles with a crack to the number of said secondary particles without a crack is 2% or more and 5% or less,
    wherein, said secondary particles being an aggregated plurality of primary particles, the average particle size of said primary particles is 0.1 to 3.0 μm, the average particle size of said active material particles is 10 to 30 μm, at least said surface layer portion of said active material particles includes element Me of at least one selected from the group consisting of Mn, Al, Mg, Ca, Zr, B, W, Nb, Ta, In, Mo, and Sn, said element Me is distributed more in said surface layer portion of said active material particles compared with an inner portion of said secondary particle, and said element me is distributed more in said surface layer portion compared with a second formed by said crack.

2. The lithium ion secondary battery in accordance with claim 1, wherein element L includes at least one selected from the group consisting of Al, Mn, Ti, Mg, Zr, Nb, Mo, W, Y, Ca, B, Ta, In, and Sn.

3. The lithium ion secondary battery in accordance with claim 1, wherein said element Me and said element L form crystal structures different from each other.

4. The lithium ion secondary battery in accordance with claim 1, wherein in said surface layer portion, said element Me forms an oxide having a crystal structure different from said lithium composite oxide.

5. The lithium ion secondary battery in accordance with claim 1, wherein the amount of said element Me is 2 mol% or less relative to the lithium composite oxide.

6. The lithium ion secondary battery in accordance with claim 1, wherein said ratio R of the number of said secondary particles with a crack is 3.5% or more and 5% or less.

7. The lithium ion secondary battery in accordance with claim 1, wherein $0.01 \leq y \leq 0.1$.

8. The lithium ion secondary battery in accordance with claim 1, wherein when said element L includes Al, atomic ratio b of Al relative to the total of said element M and said element L is $0.01 \leq b \leq 0.08$.

9. The lithium ion secondary battery in accordance with claim 1, wherein when said element L includes Mn, atomic ratio c of Mn relative to the total of said element M and said element L is $0.01 \leq c \leq 0.35$.

10. The lithium ion secondary battery in accordance with claim 1, wherein when said element L includes Ti, atomic ratio d of Ti relative to the total of said element M and said element L is $0.01 \leq d \leq 0.1$.

11. The lithium ion secondary battery in accordance with claim 1, wherein element Me is at least one selected from the group consisting of Mn, Al, Mg, Ca, B, W, Nb, Ta, In, Mo, and Sn.

12. A method for producing a lithium ion secondary battery comprising the steps of:
 (i) applying a positive electrode material mixture including active material particles including secondary particles of a lithium composite oxide on a positive electrode core material, at least a surface layer portion of said active material particles including element Me of at least one selected from the group consisting of Mn, Al, Mg, Ca, Zr, B, W, Nb, Ta, In, Mo, and Sn, said element Me being distributed more in said surface layer portion of said active material particles compared with the inner portion,
 (ii) rolling said positive electrode material mixture with said positive electrode core material to obtain a positive electrode where said secondary particles include a secondary particle with a crack which reaches an inner portion of the secondary particle from the surface layer portion and a secondary particle without a crack, and ratio R of the number of said secondary particles with a crack to the number of said secondary particles without a crack is 2% or more and 5% or less,
 (iii) obtaining a negative electrode, and
 (iv) interposing a separator between said positive electrode and said negative electrode
wherein: said lithium composite oxide is represented by $Li_xM_{1-y}L_yO_2$, where $0.85 \leq x \leq 1.25$; $0.005 \leq y \leq 0.35$; element M includes Ni and Co; element L is at least one selected from the group consisting of an alkaline earth element, a transition metal element other than Ni and Co, a rare-earth element, a IIIb group element, and a IVb group element, an atomic ratio a of Co relative to the total of said element M and said element L is $0.05 \leq a \leq 0.25$, said secondary particles being an aggregated plurality of primary particles, the average particle size of said primary particles is 0.1 to 3.0 μm, the average particle size of said active material particles is 10 to 30 μm, and said element me is distributed more in said surface layer portion compared with a second formed by said crack.

* * * * *